(12) United States Patent
Greene et al.

(10) Patent No.: US 10,178,345 B2
(45) Date of Patent: Jan. 8, 2019

(54) APPARATUS, SYSTEMS AND METHODS FOR SYNCHRONIZATION OF MULTIPLE HEADSETS

(71) Applicant: EchoStar Technologies L.L.C., Englewood, CO (US)

(72) Inventors: Gregory Greene, Littleton, CO (US); David Innes, Littleton, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 0 days.

(21) Appl. No.: 16/002,483

(22) Filed: Jun. 7, 2018

(65) Prior Publication Data

US 2018/0288365 A1  Oct. 4, 2018

Related U.S. Application Data

(63) Continuation of application No. 15/148,888, filed on May 6, 2016, now Pat. No. 9,998,703, which is a continuation of application No. 14/534,650, filed on Nov. 6, 2014, now Pat. No. 9,338,391.

(51) Int. Cl.
| | |
|---|---|
| *H04R 1/10* | (2006.01) |
| *H04N 5/935* | (2006.01) |
| *H04N 21/442* | (2011.01) |
| *H04N 21/434* | (2011.01) |
| *H04N 21/41* | (2011.01) |

(Continued)

(52) U.S. Cl.
CPC ......... *H04N 5/935* (2013.01); *H04N 21/4126* (2013.01); *H04N 21/4307* (2013.01); *H04N 21/4341* (2013.01); *H04N 21/44227* (2013.01); *H04N 21/4396* (2013.01)

(58) Field of Classification Search
CPC ........... H04N 21/4307; H04N 21/4341; H04N 21/44227; H04N 5/935; H04N 21/4126; H04N 21/4396
USPC ......................................................... 381/74
See application file for complete search history.

(56) References Cited

U.S. PATENT DOCUMENTS

| | | |
|---|---|---|
| 7,634,227 B2 | 12/2009 | de Jong |
| 7,668,243 B2 | 2/2010 | Ho et al. |
| 8,102,836 B2 | 1/2012 | Jerlhagen et al. |

(Continued)

FOREIGN PATENT DOCUMENTS

WO  2014033570 A1  3/2014

*Primary Examiner* — Paul S Kim
(74) *Attorney, Agent, or Firm* — Lowe Graham Jones PLLC

(57) ABSTRACT

Media device systems and methods synchronize video content with audio content presented by a plurality of wireless audio headsets. In an exemplary embodiment, a first time delay corresponds to a first duration of time between communication of the audio content from the media device and presentation of the audio content by a first wireless audio headset. A second time delay corresponds to a second duration of time between communication of the audio content from the media device and presentation of the audio content by a second wireless audio headset, wherein the first time delay is greater than the second time delay. Video content communicated to a display is delayed by the first time delay. Audio content communicated to the second wireless audio headset is delayed by a time delay difference between the first time delay and the second time delay.

20 Claims, 2 Drawing Sheets

(51) Int. Cl.
*H04N 21/43* (2011.01)
*H04N 21/439* (2011.01)

(56) References Cited

U.S. PATENT DOCUMENTS

| | | |
|---|---|---|
| 8,284,310 B2 | 10/2012 | Mallinson |
| 8,325,930 B2 | 12/2012 | Kim et al. |
| 8,441,577 B2 | 5/2013 | Davis |
| 8,505,054 B1 | 8/2013 | Kirley |
| 8,665,320 B2 | 3/2014 | Holley |
| 8,665,370 B2 | 3/2014 | Lin |
| 8,706,279 B2 | 4/2014 | Cho |
| 8,743,284 B2 | 6/2014 | Russell et al. |
| 8,751,705 B2 | 6/2014 | Minemura |
| 8,811,375 B2 | 8/2014 | Gha et al. |
| 2003/0179317 A1 | 9/2003 | Sigworth |
| 2010/0295993 A1 | 11/2010 | Oh |
| 2011/0187927 A1 | 8/2011 | Simon |
| 2012/0008045 A1 | 1/2012 | Yao |
| 2012/0099594 A1 | 4/2012 | Lau et al. |
| 2012/0200774 A1* | 8/2012 | Ehlers, Sr. ......... H04N 21/4307 348/515 |
| 2013/0201397 A1 | 8/2013 | Ayoub et al. |
| 2014/0259050 A1 | 9/2014 | Goldberg |

\* cited by examiner

APPARATUS, SYSTEMS AND METHODS FOR SYNCHRONIZATION OF MULTIPLE HEADSETS

PRIORITY CLAIM

This patent application is a Continuation of U.S. Non-Provisional patent application Ser. No. 15/148,888, filed May 6, 2016 which is a Continuation of U.S. Non-Provisional patent application Ser. No. 14/534,650, filed Nov. 6, 2014, entitled "APPARATUS, SYSTEMS AND METHODS FOR SYNCHRONIZATION OF MULTIPLE HEADSETS," issued as U.S. Pat. No. 9,338,391 on May 10, 2016, which is hereby incorporated herein by reference in its entirety.

BACKGROUND

Media devices, such as a set top box, a stereo, a television, a computer system, a game system, or the like, are often configured to communicate audio information to a user's audio headset. The audio headset user can view presented video content on a display, such as their television (TV), while listening to the corresponding audio content using their audio headset. The audio content may be communicated to the user's audio headset using a wire-based medium when the audio headset is communicatively coupled to the media device using a wire-based connector. Alternatively, the audio content may be communicated to the user's audio headset using a wireless-based medium when the audio headset is communicatively coupled to the media device using a suitable wireless transceiver.

Wireless communication of the audio content requires various processing steps. Each processing step introduces a delay in the final presentation of the audio content on the user's audio headset. For example, but not limited to, the original audio content must be split off from the originally received video/audio content stream. If the audio headset is a wireless type device, the audio content must be converted into a wireless medium format, and then communicated to the audio headset. Finally, the wireless audio headset must detect then wireless signal with the audio content, and then process the wireless signal to generate a signal that is reproducible as sound using the speakers of the wireless audio headset. Accordingly, the output of the video content and the output of the audio content may not be in synchronism when the delay times of processing and presenting the video content is different from the delay times of processing, communicating and presenting the audio content.

Various systems and methods have been devised to correct for the above-described video/audio synchronization problem for a wireless audio headset. Essentially, a delay in presentation of the video content and/or the audio content is implemented so that the video content and the audio content are presented in synchronism (or at least substantially in synchronism with each other so that the user substantially perceives that video content and the audio content are synchronously presented).

However, in some situations, multiple users may wish to simultaneously view the video content while individually listening to the audio content using their own personal audio headsets. For example, the multiple users at an apartment complex where watching a loud action movie late at night using their stereo system with external speakers may not be practical. Accordingly, the multiple users may watch the movie video content on their large screen TV while listening to the audio content using their own audio headsets.

A problem not addressed in the prior art is synchronism of video content presentation with audio content when the audio content is presented on multiple wireless and/or wire-based audio headsets. This problem becomes particularly complex in view that there are a wide variety of different types of wireless audio headsets in the market place, each with different inherent audio content processing time delays.

Further, a wire-based audio headset may be inherently synchronized with the presented video when the media device is sourcing both the video display and the wireless audio headset. Synchronism corrections to a concurrently user wireless audio headset will then cause the wire-based headset to become out of synchronism with the video content.

Accordingly, there is a need in the arts to provide enhanced synchronism of video content presentation with audio content when the audio content is presented on multiple wire-based and/or wireless audio headsets.

SUMMARY

Systems and methods of synchronizing presentation of video content with a plurality of different wireless audio headsets are disclosed. In an exemplary embodiment, a first time delay corresponds to a first duration of time between communication of the audio content from the media device and presentation of the audio content by a first wireless audio headset. A second time delay corresponds to a second duration of time between communication of the audio content from the media device and presentation of the audio content by a second wireless audio headset, wherein the first time delay is greater than the second time delay. Video content communicated to a display is delayed by the first time delay. Audio content communicated to the second wireless audio headset is delayed by a time delay difference between the first time delay and the second time delay.

BRIEF DESCRIPTION OF THE DRAWINGS

Preferred and alternative embodiments are described in detail below with reference to the following drawings.

DETAILED DESCRIPTION

Figure 1:
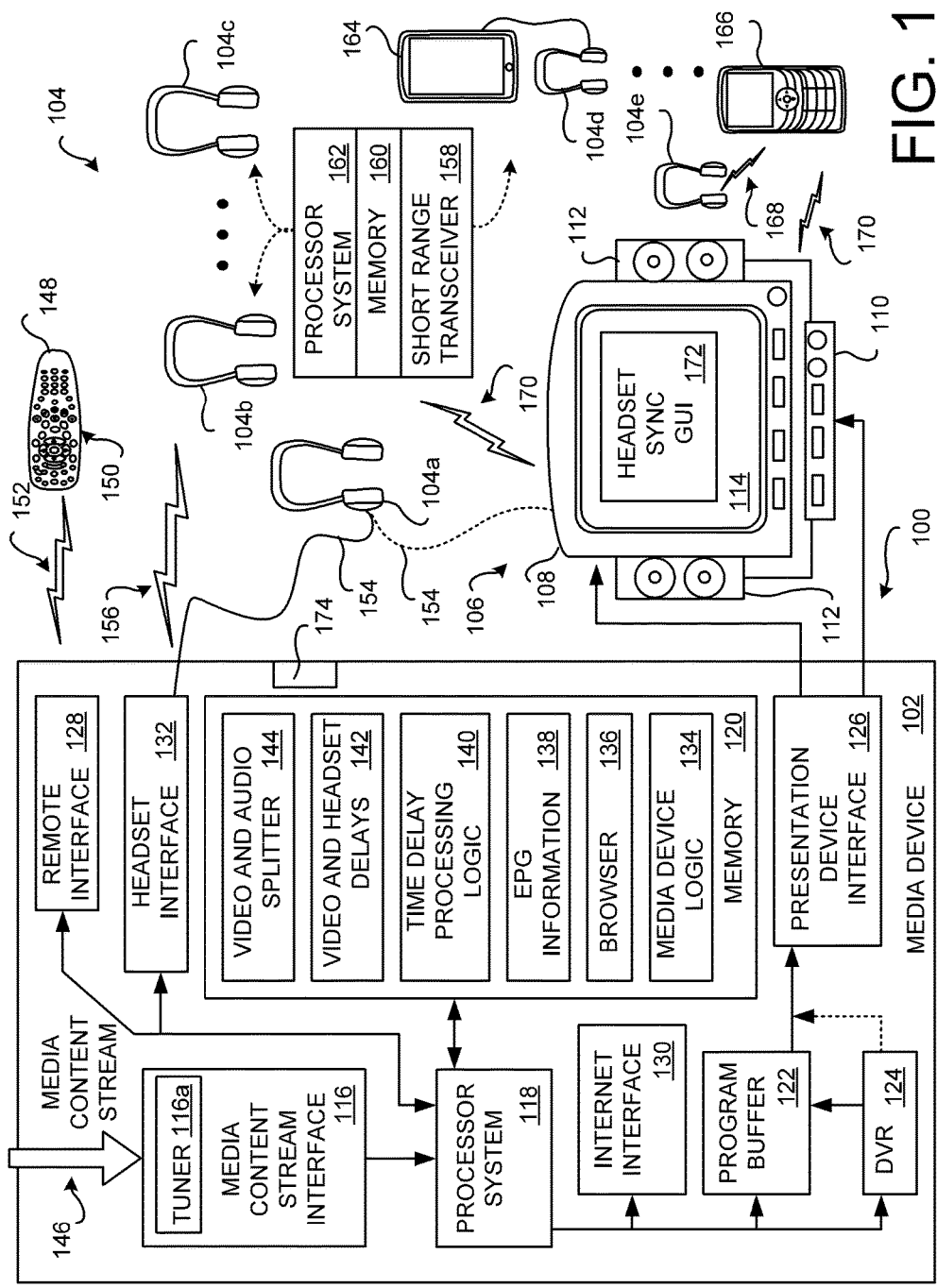
FIG. 1 is a block diagram of an embodiment of an audio synchronism system implemented in a media device.

FIG. 1 is a block diagram of an embodiment of a audio synchronism system 100 implemented in a media device 102, such as, but not limited to, a set top box (STB). Embodiments of the audio synchronism system 100 may be implemented in other media devices 102, such as, but not limited to, a surround-sound receiver, a television (TV), a tablet computer, a laptop computer, a personal computer (PC), a digital video disc (DVD) player, a digital video recorder (DVR), or a game playing device. Here, such exemplary media devices 102 are configured to communicate the audio content to a plurality of audio headsets 104.

Embodiments of the audio synchronism system 100 are configured to synchronize presentation of video content and audio content with a plurality of different types of audio headsets 104 (wireless audio headsets and/or wire-based audio headsets). Based on unique time delay associated with communication to and presentation of the audio content by different audio headsets 104, and based on the time delay associated with presentation of the associated video content, embodiments of the audio synchronism system 100 adjust the times that the media device 102 communicates the video content and/or the audio content such that the video content is synchronously presented with the audio content.

The exemplary media device 102 is communicatively coupled to a media presentation system 106 that includes a visual display device 108, such as a television (hereafter, generically a TV), and an audio presentation device 110, such as a surround sound receiver controlling an audio reproduction device 112 (hereafter, generically, a speaker). Other types of output devices may also be coupled to the media device 102, including those providing any sort of stimuli sensible by a human being, such as temperature, vibration and the like. The video content portion of a media content event is displayed on the display 114 and the audio portion of the media content event is reproduced as sounds by one or more speakers 112. In some embodiments, the media device 102 and one or more of the components of the media presentation system 106 may be integrated into a single electronic device.

The non-limiting exemplary media device 102 comprises a media content stream interface 116, a processor system 118, a memory 120, a program buffer 122, an optional digital video recorder (DVR) 124, a presentation device interface 126, a remote interface 128, an optional internet interface 130, and an audio headset interface 132. The memory 120 comprises portions for storing the media device logic 134, an optional browser 136, the electronic program guide (EPG) information 138, time delay processing logic 140, video and headset delays 142, and the video and audio splitter 144. In some embodiments, the media device logic 134, the browser 136, the time delay processing logic, and the video and audio splitter, and/or may be integrated with other logic. In other embodiments, some or all of these memory and other data manipulation functions may be provided by and using remote server or other electronic devices suitably connected via the Internet or otherwise to a client device. Other media devices 102 may include some, or may omit some, of the above-described media processing components. Further, additional components not described herein may be included in alternative embodiments The functionality of the media device 102, here a set top box, is now broadly described. A media content provider provides media content that is received in one or more multiple media content streams 146 multiplexed together in one or more transport channels. The transport channels with the media content streams 146 are communicated to the media device 102 from a media system sourced from a remote head end facility (not shown) operated by the media content provider. Non-limiting examples of such media systems include satellite systems, cable system, and the Internet. For example, if the media content provider provides programming via a satellite-based communication system, the media device 102 is configured to receive one or more broadcasted satellite signals detected by an antenna (not shown). Alternatively, or additionally, the media content stream 146 can be received from one or more different sources, such as, but not limited to, a cable system, a radio frequency (RF) communication system, or the Internet.

The one or more media content streams 146 are received by the media content stream interface 116. One or more tuners 116a in the media content stream interface 116 selectively tune to one of the media content streams 146 in accordance with instructions received from the processor system 118. The processor system 118, executing the media device logic 134 and based upon a request for a media content event of interest specified by a user, parses out media content associated with one or more media content events of interest. The video and audio splitter 144 is configured to separate the video content and the audio content. The media content event of interest is then assembled into a stream of video content and audio content. The video content and the audio content may be stored by the program buffer 122 such that the video content and the audio content can be streamed out to components of the media presentation system 106, such as the visual display device 108 and/or the audio presentation device 110, via the presentation device interface 126. Alternatively, or additionally, the parsed out media content may be saved into the DVR 124 for later presentation. The DVR 124 may be directly provided in, locally connected to, or remotely connected to, the media device 102. In alternative embodiments, the media content streams 146 may stored for later decompression, processing and/or decryption.

From time to time, information populating the EPG information 138 portion of the memory 120 is communicated to the media device 102, via the media content stream 146 or via another suitable media. The EPG information 138 portion of the memory 120 stores the information pertaining to the scheduled programming of media content events received in the media content stream 146. The information may include, but is not limited to, a scheduled presentation start and/or end time, a program channel, and descriptive information for individual media content events. The media content event's descriptive information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 138 is retrieved, formatted, and then presented on the display 114 as an EPG.

The exemplary media device 102 is configured to receive commands from a user via a remote control 148. The remote control 148 includes one or more controllers 150 disposed on the surface of the remote control. The user, by actuating one or more of the controllers 150, causes the remote control 148 to generate and transmit commands, via a wireless signal 152, to the media device 102. The commands control the media device 102 and/or control the media presentation devices. The wireless signal 152 may be an infrared (IR) signal or a radio frequency (RF) signal that is detectable by the remote interface 128.

The processes performed by the media device 102 relating to the processing of the received media content stream 146 and communication of a presentable video content and the audio content of the media content event to the components of the media presentation system 106 are generally implemented by the processor system 118 while executing the media device logic 134. Thus, the media device 102 may perform a variety of functions related to the processing and presentation of one or more media content events received in the media content stream 146.

In some embodiments, the media device 102 automatically mutes the audio content output from the speakers 112 if one or more of the audio headsets 104 are coupled to the media device 102. For example, the audio content portion of the presented media content event may not be communicated out from the presentation device interface 126 to components of the media presentation system 106. Accordingly, the speakers 112 do not produce the audio content.

Alternatively, some embodiments may optionally continue to output the audio content from the speakers 112 if one or more of the audio headsets 104 are coupled to the media device 102. Here, the user of the audio headset 104 may be hearing impaired, where the audio headset 104 provides enhanced sound control of the hearing impaired user. As another example, the user wearing the audio headset 104 may wish to have the volume presented at a louder volume level (or a lesser volume level) than the audio volume heard by other people who are listening to the audio content output from the speakers 112.

FIG. 1 illustrates a plurality of different audio headsets 104 communicatively coupled to the media device 102 using a variety of communication means. The audio headset 104a is a wire-based head phone set that couples to the media device 102 using the wire connector 154. The wire connector 154 has a suitable plug type connector that fits into a mating receptacle of the audio headset interface 132. Accordingly, the audio headset interface 132 outputs the audio content using a suitable wire-based format, such as, but not limited to, an analog signal. Some embodiments of the media device 102 may be configured to couple to a plurality of wire-based audio headsets 104 (via a plurality of receptacles and/or by using an external audio headset signal splitter).

A plurality of wireless based audio headsets 104 are configured to receive audio content from the media device 102 via a wireless signal 156. Further, the wireless audio headsets 104 may be different from each other, such as the example wireless audio headset 104b and the wireless audio headset 104c. Such wireless audio headsets 104b, 104c comprise a short range transceiver 158 configured to detect the wireless signal 156 with the audio content therein. Wireless audio headsets 104b, 104c also comprise a memory 160 and a processor system 162. Logic for receiving and processing the audio content received in the wireless signal 156 resides in the memory 160. Further, in some embodiments of the wireless audio headsets 104b, 104c, an identifier of that particular wireless audio headset 104b, 104c is stored in the memory 160. The identifier of the wireless audio headset 104b, 104c may be retrieved and communicated to the media device 102, via the short range transceiver 158. Accordingly, the media device 102 can determine a time delay that is associated with that particular identified wireless audio headset 104b, 104c. The time delay is a duration of time for the communication, reception and processing of the wireless signal 156, and the attendant reproduction of the audio content on the speakers of, the wireless audio headset 104b, 104c. The functions of processing the received wireless signal 156, generating the audio content for reproduction on the speakers of the wireless audio headset 104b, 104c, and/or the retrieval and communication of the identifier of the wireless audio headset 104b, 104c is performed by the processor system 162.

In situations where the wireless audio headset 104b is different from the wireless audio headset 104c, the time delay associated with that particular wireless audio headsets 104b, 104c may be different from each other. For example the time delay of the wireless audio headset 104b may be known to be fifty milliseconds (50 ms) and the time delay of the wireless audio headset 104c may be known to be two hundred milliseconds (200 ms). Accordingly, audio content presentation on the wireless audio headset 104b would be delayed by 50 ms behind presentation of the video content on the display 114. The audio content presented for the wireless audio headset 104c would be delayed by 200 ms behind presentation of the video content on the display 114. Here, synchronization of the audio content from the wireless audio headset 104c with the video content may be effected by delaying presentation of the video content by 200 ms. However, audio content presentation on the wireless audio headset 104b would otherwise be in advance of the presented video content by 150 ms. Accordingly, embodiments delay the audio content presentation on the wireless audio headset 104b by an additional 150 ms. Accordingly, the video content is in synchronism with the audio content presented by both the audio headsets 104b, 104c.

In some embodiments, the different wireless audio headsets 104b, 104c may be configured to receive the same format signal. That is, the different audio headsets 104b, 104c detect the same emitted wireless signal 156. However, the inherent time delay of each different one of the plurality of wireless audio headsets 104b, 104c may be different, particularly if they have been made by different manufacturers, have been made using different types of components, and/or it they have different features. For example, one of the wireless audio headsets 104b, 104c may have complex logic or circuitry configured to emulate the effect of a surround sound or other multiple audio channel system.

In an example embodiment, the wireless signal 156 is a Bluetooth communication signal. The Bluetooth communication signal is well known to employ a short range wireless technology standard for exchanging data over short distances using short-wavelength ultra high frequency (UHF) radio waves in the industrial, scientific and medical (ISM) radio band from 2.4 to 2.485 GHz. Bluetooth technology may be used by fixed and mobile devices, such as the example wireless audio headsets 104b, 104c. In such embodiments, the audio headset interface 132 of the media device 102 (a fixed electronic device) and the short range transceiver 158 of the wireless audio headsets 104b, 104c (mobile electronic devices) include a Bluetooth transceiver. The detectable range of the wireless signal 156 by the media device 102 and the wireless audio headsets 104b, 104c is inherently limited to several meters by the Bluetooth technology.

The Bluetooth protocol provides for secure exchange of information between a devices. Under the Bluetooth protocol, the master device (the wireless audio headset 104b, 104c) periodically broadcasts out the wireless signal 156 having its identifier of the broadcasting Bluetooth wireless audio headset 104b, 104c. In the various embodiments of the audio synchronism system 100, the media device 102 only needs to detect the emitted wireless signal 156 from the Bluetooth compatible authorizing wireless audio headset 104b, 104c. Accordingly, the media device 102 may identify a particular wireless audio headset 104b, 104c, and thus determine the particular time delay that is suitable for that particular wireless audio headset 104b, 104c.

In such embodiments where the different audio headsets 104b, 104c detect the same emitted wireless signal 156, the audio synchronism system 100 may be configured to communicate portions of the wireless signals 156 using the same medium, wherein each wireless signal 156 is designated for a particular one of a plurality of audio headsets 104. For example, the wireless audio headsets 104b, 104c may both employ a Bluetooth communication medium, but may have different associated time delays. Since the Bluetooth medium employs a packet-based technology wherein a portion of the audio content is communicated as data in a voice data packet, a unique identifier of the particular destination wireless audio headset 104b, 104c may be included in each voice data packet communicated in the wireless signal 156. Accordingly, a particular portion of the audio content in a first packet for the wireless audio headset 104b (identified by the unique identifier of the wireless audio headset 104b) can be communicated a particular time. The same portion of the audio content may be communicated at a different time in a second packet for the wireless audio headset 104c (identified by the unique identifier of the wireless audio headset 104c). Here, the wireless audio headset 104b processes received voice data packets with its unique identifier to generate a stream of audio content based on the first time that the packet was communicated from the media device 102 to the wireless audio headset 104b. Similarly, the wireless audio headset 104c processes received voice data packets with its unique identifier to generate a stream of audio content based on a second time that the packet was communicated from the media device 102 to the wireless audio headset 104c.

Alternatively, or additionally, embodiments of the media device 102 and the wireless audio headsets 104b, 104c may be configured to receive wireless signal 156 using a wireless local area network (LAN) protocol such as under the Institute of Electrical and Electronics Engineers (IEEE) 802.11 standard or other similar standard. For example, the mobile electronic device may be a user's portable laptop computer, notebook, or the like that is configured to communicate wirelessly with a non-mobile electronic device such as a printer or to websites via the Internet. Embodiments of the media device 102 and the wireless audio headsets 104b, 104c may be configured to communicate using a wireless LAN protocol. Other embodiments may employ a Wi-Fi compatible protocol.

In embodiments where different wireless mediums are used, the audio headset interface 132 may include a plurality of different transceiver therein that are configured to communicate using different mediums. For example, but not limited to, a first transceiver may be included in the audio headset interface 132 that is compatible with Bluetooth communications and a second transceiver may be included in the audio headset interface 132 that is compatible with Wi-Fi communications. Alternatively, a plurality of different audio headset interfaces 132, each using different communication mediums, may be implemented in the media device 102.

In some embodiments, an intermediate mobile electronic device may configured to detect the wireless signal 156 emitted from the media device 102. For example, a mobile tablet 164 and/or a mobile phone 166 may detect the wireless signal 156 with the audio content therein, and then present the audio content on an audio headset coupled to that intermediate mobile device. For example, but not limited to, a wire-based wireless audio headset 104d is illustrated as being coupled to the exemplary intermediate mobile electronic device, a tablet 164, such that the wire-based audio headset 104d receives the audio content from the tablet 164 via a second wire conductor. As another non-limiting example, a wireless audio headset 104e is illustrated as being coupled to another intermediate mobile electronic device, the mobile phone 166, such that the wireless audio headset 104e receives the audio content from the mobile phone 166 via a second wireless signal 168. Such mobile electronic devices, such as cell phones, smart phones, tablets, and/or note pads may be provisioned with a low range wireless communication system, such as, but not limited to, a Bluetooth system. Their respective Bluetooth system is then configured to emit a wireless signal 156 that is used for identifying themselves to the media device 102. Accordingly, the media device 102 can determine a suitable delay that is appropriate for presentation of the audio content on the wireless audio headsets 104d, 104e.

In some embodiments, the wire-based audio headset 104a may be coupled to one of the components of the media presentation system 106, such as the visual display device 108 or the audio presentation device 110, using the wire connector 154 (conceptually illustrated using a dashed line to the visual display device 108). Accordingly, some amount of time delay may be associated with presentation of the audio content when communicated to the wire-based audio headset 104a via the intervening component of the media presentation system 106.

Alternatively, or additionally, one or more of the components of the media presentation system 106 may be configured to communicate audio content to one or more of the wireless audio headsets 104b, 104c, and/or to the intermediate mobile electronic device (mobile tablet 164 and/or a mobile phone 166) using a second wireless signal 170. Accordingly, some additional amount of time delay may be associated with presentation of the audio content when communicated via the wireless signal 170 (via the intervening component of the media presentation system 106). In such embodiments, the component of the media presentation system 106 transmitting the wireless signal 170 would include a suitable wireless signal interface (transceiver).

When a plurality of different audio headsets 104 are concurrently used to present audio content to a user of that particular audio headset 104, embodiments of the audio synchronism system 100 are configured to synchronize audio output from all of the actively used audio headsets 104 with presentation of the video content on the display 114. Accordingly, all users of the audio headsets, and optionally any users listening to the audio content output from the speakers 112, hear the presented audio content and view the synchronously presented video content.

In the various embodiments, a time delay for each particular audio headset 104 and/or for each intermediate mobile electronic device is stored as information in the video and audio headset delays 142 portion of memory 120. The time delays for each particular audio headset 104, and for each intermediate mobile electronic device, may be determined in any suitable manner.

In some embodiments, a headset synchronization (sync) graphical user interface (GUI) 172 may be presented to indicate to the user which wireless audio headsets 104 and/or to which intermediate mobile electronic devices are currently being used to present audio content that has been received from the media device 102. The user may, via the headset sync GUI 172, select and/or identify which wireless audio headsets 104 and/or to which intermediate mobile electronic devices are currently being used to present audio content. In some embodiments, the user may, via the headset sync GUI 172, initiate a learning process or the like wherein a time delay for a new wireless audio headset 104 is determined by and/or is provided to the media device 102.

In some embodiments, the user is able to specify time delays for a particular wireless audio headset 104 and/or for a particular intermediate mobile electronic device. For example, time delay information may be available in device manuals or online at a website that the user may separately access. The user, by actuation controllers 150 on their remote control 148, identify the particular wireless audio headset 104 and then enter a numerical value for the time delay associated with the specified wireless audio headset 104.

Alternatively, or additionally, the headset sync GUI 172 is configured to permit the media device to determine, or at least approximate, time delays based on user feedback. In some embodiments, one or more audible test signals are emitted from the media device 102, and a microphone or other audio sound detector 174 in the media device 102 detects the emitted audible test signal. Based on the time that the audible test signal was emitted from the media device 102 and the time that the audible test signal was detected at the media device, the delay time can be determined.

Alternatively, or additionally, the audible test signal may be communicated to the user's wireless audio headset 104. The user of the tested audio headsets 104 may actuate one of the controllers 150 on their remote control 148 when they begin to hear the presentation of the audible test signal. Based on a response from the user, such as by actuation of a controller 150 on the remote control 148, the delay time can be determined.

Alternatively, or additionally, a visual test signal may be communicated concurrently with the audible test signal. The user will initially perceive the mis-synchronism between presentation of the visual test signal on the display 114 and their hearing of the audible test signal on their wireless audio headset 104. The user, by navigating about the headset sync GUI 172, may then manually enter time delays. A specific value of a time delay change may be specified by the user. Alternatively, or additionally, incremental time delay adjustments may be initiated by the user. After a plurality of iterations of viewing the visible test signal and hearing the audible test signal, a final time delay can be determined when the user finally perceives synchronization between presentation of the visual test signal and presentation of the audible test signal.

In some embodiments, the time delay information for particular audio headsets 104 and/or for particular intermediate mobile electronic devices are provided to the media device. In some embodiments, the time delay information is included in the wireless signal 156 emitted by that audio headset 104 or intermediate mobile electronic device. Alternatively, or additionally, the browser 136 may be used to access a remote site to obtain time delay information.

In some embodiments, a time delay associated with communication of the video content and/or the audio content from the media device 102 to components of the media presentation system 106, and the delay times associated with the attendant presentation of the video and audio content by components of the media presentation system 106, are stored as information in the video and audio headset delays 142. For example, but not limited to, a time delay for presentation of video on the display 114 may be stored as information in the video and audio headset delays 142. If different displays 114 might be used for presentation of the video content, then different delay times may be stored. For example, a large screen TV in a media room may be used to present video content received from the media device 102. Alternatively, or additionally, another TV may be in another room, such as the kitchen or a bedroom, and be presenting video content received from the media device 102.

Figure 2:
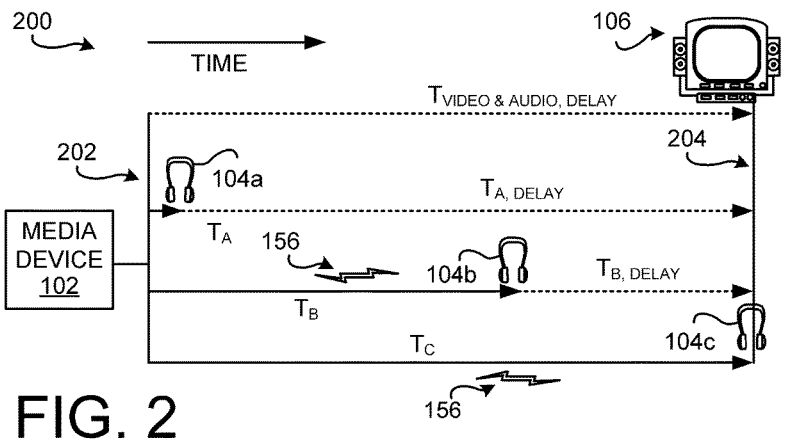
FIG. 2 illustrates a hypothetical time line diagram showing time delays associated with presentation of video content and audio content when a plurality of audio headsets are used to present audio content.

FIG. 2 illustrates a hypothetical time line diagram 200 showing time delays associated with presentation of video content and audio content when a plurality of audio headsets 104a, 104b, and 104c are used to present audio content. The time line diagram conceptually illustrates passage of time (from left to right). Accordingly, the time line diagram 200 illustrates communication of the video content and/or audio content at time 202 from the media device 102. A presentation time 204 is conceptually illustrated to indicate presentation of the video content by the media presentation system 106.

For example, the time line portion $T_A$ conceptually illustrates a time delay $T_A$ that is required for the media device 102 to communicate audio content, and then for the audio headset 104a to present the audio content therefrom. Here, the time delay $T_A$ is a relatively short duration since the wire-based audio headset 104a is directly coupled to the media device 102 via the wire connector 154 (FIG. 1).

In contrast, the time delay $T_B$ that is required for the wireless audio headset 104b to receive the wireless signal 156, process the audio information therein, and then present the audio content on its wireless audio headset speaker is a relatively longer duration. Similarly, the time delay $T_C$ that is required for the wireless audio headset 104c to receive the wireless signal 156, process the audio information therein, and then present the audio content to its wireless audio headset speaker is another relatively longer duration. Presuming that the wireless audio headsets 104b, 104c are different from each other, the time delay $T_B$ and the time delay $T_C$ are different from each other. In the hypothetical example illustrated in FIG. 2, the time delay $T_C$ is larger (has a greater duration) that the time delay $T_B$.

In the hypothetical example of FIG. 2, embodiments of the audio synchronism system 100 initially determine which particular audio headsets 104 are currently being used to present audio content to the plurality of users. In an example embodiment, the identifier of each of the wireless audio headsets 104 is provided to, and/or is detected by, the media device 102. Time delays associated with presentation of audio content, if any, are then determined, are user specified, and/or are retrieved from the video and headset delays 142 portion of memory 120, for each wireless audio headset 104. Then, the longest time delay is then selected, identified or determined. In the hypothetical example of FIG. 2, the longest time delay is the time delay $T_C$ associated with the wireless audio headset 104c.

Once the longest duration time delay is determined, the media device 102 delays communication of the video content to the visual display device 108 of the media presentation system 106 by a time delay amount equal to a duration of $T_{VIDEO\ \&\ AUDIO,\ DELAY}$. Here, the duration of $T_{VIDEO\ \&\ AUDIO,\ DELAY}$ is substantially equal to the duration of the time delay $T_C$ that is associated with the wireless audio headset 104c. Accordingly, the video content presented on the display 114 of the visual display device 108 is presented synchronously with the audio content presented by the wireless audio headset 104c. In some embodiments, if there is known time delay associated with communication and presentation of the video content on the display 114 (not shown in FIG. 2), then that duration may be subtracted from the time delay $T_C$ to determine the duration of $T_{VIDEO\ \&\ AUDIO,\ DELAY}$.

However, after the video portion is delayed by the duration of $T_{VIDEO\ \&\ AUDIO,\ DELAY}$, the video content presented on the display 114 of the visual display device 108 will be out of synchronism with the audio content presented by the wire-based audio headset 104a. The amount of time of the out-of-synchronization between the presented video content and audio content presented by the audio headset 104a corresponds to the duration identified as $T_{A,\ DELAY}$. Accordingly, embodiments of the audio synchronism system 100 delay communication of the audio content to the audio headset 104a by the time delay of $T_{A,\ DELAY}$. Thus, the video content presented on the display 114 of the visual display device 108 is presented synchronously with the audio content presented by the wire-based audio headset 104a. The duration of the time delay $T_{A, DELAY}$ is determined once the duration of the video content delay $T_{VIDEO \& AUDIO, DELAY}$ is determined. The duration of the $T_{A, DELAY}$ is determined by subtracting out the duration of the time delay $T_A$ from the duration of $T_{VIDEO \& AUDIO, DELAY}$.

Similarly, after the video portion is delayed by the duration of $T_{VIDEO \& AUDIO, DELAY}$, the video content presented on the display 114 of the visual display device 108 will be out of synchronism with the audio content presented by the wireless audio headset 104b. The amount of time of the out-of-synchronization between the presented video content and audio content presented by the wireless audio headset 104b corresponds to the duration identified as $T_{B, DELAY}$. Accordingly, embodiments of the audio synchronism system 100 delay communication of the audio content to the wireless audio headset 104b by the time delay of $T_{B, DELAY}$. That is, the communication of the audio content is delayed to the second wireless audio headset 104b by the time delay difference between the larger (first) time delay $T_C$ of the wireless audio headset 104c and the smaller (second) time delay $T_B$ of the wireless audio headset 104b. Thus, the video content presented on the display 114 of the visual display device 108 is also then presented synchronously with the audio content presented by the wireless audio headset 104b. The duration of the $T_{B, DELAY}$ is determined by subtracting out the duration of the time delay $T_B$ from the duration of $T_{VIDEO \& AUDIO, DELAY}$.

For example, the time delay $T_B$ of the wireless audio headset 104b may be known to be fifty milliseconds (50 ms) and the time delay $T_C$ of the wireless audio headset 104c may be known to be two hundred milliseconds (200 ms). Accordingly, the audio content presentation on the wireless audio headset 104a would be delayed by 200 ms. The audio content presentation for the wireless audio headset 104b would be delayed by 150 ms. Accordingly, the presented video content would be in synchronism with the wireless audio headsets 104a, 104b, 104c.

In some instances, the audio content is also output from the speakers 112 of the media presentation system 106. Here, the presented video content would be in synchronism with the audio content output from the speakers 112.

In alternative embodiments, communication of the audio content could be communicated in advance of the video content by the associated time delay amounts. In the above-described example, communication of the audio content on the wireless audio headset 104c would be advanced by 200 ms before communication of the video content. Communication of the audio content for the wireless audio headset 104b would be delayed by 50 ms before communication of the video content. Here, the presented video content would be in synchronism with the audio content output from the audio headsets 104.

Figure 3:
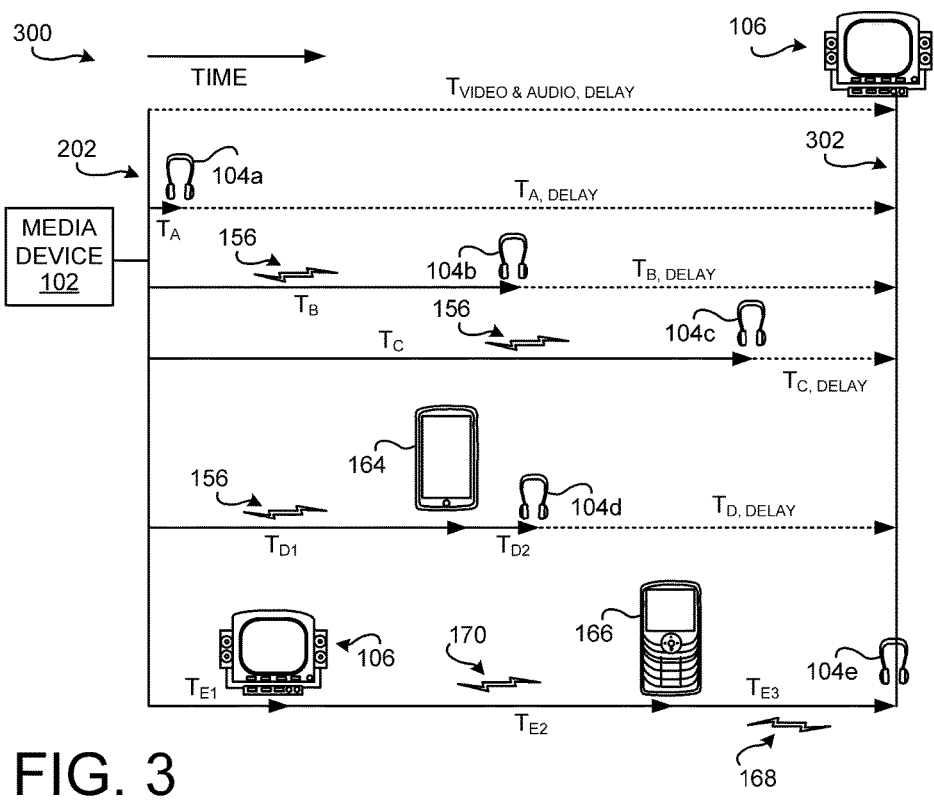
FIG. 3 illustrates a hypothetical time line diagram showing time delays associated with presentation of video content and audio content when a plurality of audio headsets and intermediate mobile electronic devices are used to present audio content.

FIG. 3 illustrates a hypothetical time line diagram 300 showing time delays associated with presentation of video content and audio content when a plurality of audio headsets 104a-104e, and the intermediate mobile electronic devices 164 and 166, are used to present audio content.

In this conceptual example, the longest example time delay is for presentation of audio content on the wireless audio headset 104e. In this example, there is a first time delay $T_{E1}$ that is associated from communication of the audio content from the media device 102 to the media presentation system 106 and the associated processing of the video content performed by the component of the media presentation system 106. A second time delay $T_{E2}$ occurs for communication of the audio content in the wireless communication signal 170 from the component of the media presentation system 106 to the mobile phone 166, and the associated processing of the video content performed by the mobile phone 166. A third time delay $T_{E3}$ occurs for communication of the audio content in the wireless communication signal 168 from the mobile phone 166 to the wireless audio headset 104e, and the associated processing and presentation of the video content by the wireless audio headset. Accordingly, the delay time between communication of the audio content from the media device 102 to presentation of the audio content by the wireless audio headset 104e is the time delay $(T_{E1}+T_{E2}+T_{E3})$.

Once the longest duration time delay $(T_{E1}+T_{E2}+T_{E3})$ is determined (conceptually illustrated at a time 302), the media device 102 delays communication of the video content to the visual display device 108 of the media presentation system 106 by a time delay amount equal to a duration of $T_{VIDEO \& AUDIO, DELAY}$. Here, the duration of $T_{VIDEO \& AUDIO, DELAY}$ is substantially equal to the duration of the longest duration time delay $(T_{E1}+T_{E2}\ T_{E3})$ that is associated with the wireless audio headset 104e. Accordingly, the video content presented on the display 114 of the visual display device 108 is presented synchronously with the audio content presented by the wireless audio headset 104e.

Time delays for the audio headset 104a, 104b and 104c are determined above with reference to the determined longest duration time delay $(T_{E1}+T_{E2}\ T_{E3})$. For example, the time delay $T_{A, DELAY}$ in audio content for the first audio headset 104a would be the determined longest duration time delay $(T_{E1}+T_{E2}+T_{E3})$ minus the time delay $T_A$. The time delay $T_{B, DELAY}$ in audio content for the second wireless audio headset 104b would be the determined longest duration time delay $(T_{E1}+T_{E2}+T_{E3})$ minus the time delay $T_B$. And, the time delay $T_{C, DELAY}$ in audio content for the first audio headset 104c would be the determined longest duration time delay $(T_{E1}+T_{E2}\ T_{E3})$ minus the time delay $T_C$.

Similarly, there is a time delay $T_{D1}$ that is associated with communication of the video content via wireless signal 156 to the mobile tablet 164. After processing, the video content is communicated to the wire-based audio headset 104d that is coupled to the mobile tablet 164. Accordingly, the total video content presentation time delay $T_{D, DELAY}$ for the audio headset 104d is equal to the sum of the time delays, $(T_{D1}+T_{D2})$. Embodiments of the audio synchronism system 100 delay communication of the audio content to the wireless audio headset 104d by the time delay of $T_{D, DELAY}$, which is equal to the determined longest duration time delay $(T_{E1}+T_{E2}+T_{E3})$ minus the time delays $(T_{D1}+T_{D2})$.

It should be emphasized that the above-described embodiments of the audio synchronism system 100 are merely possible examples of implementations of the invention. Many variations and modifications may be made to the above-described embodiments. All such modifications and variations are intended to be included herein within the scope of this disclosure and protected by the following claims.

The invention claimed is:
1. A media device, comprising:
a media content stream interface configured to receive a media content event with at least video content and audio content that are to be synchronously presented with each other during presentation of the media content event to at least a first user and a second user;

an interface configured to:
    communicate the video content to a display for presentation to at least the first user and the second user viewing the display;
    communicate the audio content to at least one first speaker, wherein the audio content is heard by the first user listening to the at least one first speaker, and wherein a first time delay associated with the at least one first speaker corresponds to a first duration defined from a first time that the audio content is communicated from the presentation interface and a second time that the audio content is reproduced by the at least one first speaker; and
    communicate the audio content to at least one second speaker, wherein the audio content is heard by the second user listening to the at least second speaker, and wherein a second time delay associated with the at least one second speaker corresponds to a second duration defined from the first time that the audio content is communicated from the presentation interface and a third time that the audio content is reproduced by the at least one second speaker, wherein the second duration is greater than the first duration; and
a processor system communicatively coupled to the media content stream interface and the interface, and configured to:
    communicate the audio content to the at least one second speaker;
    delay communication of the audio content to the at least one first speaker by a first delay duration that equals a difference between the second duration and the first duration; and
    delay communication of the video content to the display by a second delay duration that equals the first duration.

2. The media device of claim 1, wherein the at least one first speaker is a first component of a media presentation system and the display is a second component of the media presentation system.

3. The media device of claim 1, wherein the at least one first speaker is a component of an audio presentation device and the display is a component of a visual display device.

4. The media device of claim 1, wherein the at least one second speaker is a component of a mobile phone, and wherein the video content is concurrently communicated to the cellular phone and is presented on a display of the mobile phone.

5. The media device of claim 1, wherein the at least one second speaker is communicatively coupled to a mobile phone, and wherein the second time delay is defined by a sum of the second duration for the audio content to be communicated from the presentation interface to the mobile device and a fourth duration for the audio content to be communicated from the mobile device to the at least one second speaker.

6. The media device of claim 1, wherein the at least one second speaker is a component of a wireless audio headset that communicates with the media device using a wireless signal, where the interface of the media device further comprises:
    a presentation device interface that is communicatively coupled to the display and the at least one first speaker; and
    a headset interface configured to communicatively couple the media device with the wireless audio headset.

7. The media device of claim 1, further comprising:
an audio sound detector communicatively coupled to the processor system,
wherein the processor system is further configured to:
    communicate an audible test signal to the at least one second speaker at a first test time, wherein the audible test signal is reproduced as an audible sound by the at least one speaker;
    receive information corresponding to a second time that corresponds to detection of the audible test signal by the audio sound detector; and
    determine the second duration based on a difference between the second time and the first test time.

8. The media device of claim 1, further comprising:
a remote interface configured to receive a wireless signal from a remote control used by the second user of the at least one second speaker,
wherein the wireless signal is generated by the remote control in response to actuation of at least one controller of the remote control by the second user when the second user hears the audible test signal reproduced by the at least one second speaker, and
wherein the processor system is further configured to:
    communicate an audible test signal to the at least one second speaker at a first test time, wherein the audible test signal is reproduced as an audible sound by the at least one speaker;
    receive the wireless signal from the remote control, wherein the wireless signal includes information corresponding to a second time that corresponds to actuation of at least one controller of the remote control by the second ne user; and
    determine the second duration based on a difference between the second time and the first test time.

9. The media device of claim 1, further comprising:
a browser that is configured to access a remote website via the Internet,
wherein the browser receives information from the remote website defining at least one of the second time delay and the second duration.

10. The media device of claim 9, wherein the processor system of the media device is further configured to:
    receive, from the at least one second speaker, identifying information that identifies the at least one second speaker; and
    communicate the identifying information to the remote website,
    wherein the information defining the at least one of the second time delay and the second duration is determined by the remote website based on the communicated identifying information that identifies the at least one second speaker.

11. The media device of claim 9, wherein the processor system of the media device is further configured to:
    receive, from the second user, identifying information that identifies the at least one second speaker; and
    communicate the identifying information to the remote website,
    wherein the information defining the at least one of the second time delay and the second duration is determined by the remote website based on the communicated identifying information that identifies the at least one second speaker.

12. The media device of claim 1, further comprising:
a remote interface configured to receive a wireless signal from a remote control used by the second user of the wireless audio headset, wherein the processor system is further configured to:
concurrently communicate a first audible test signal to the at least one second speaker and a first visual test signal that is presented on the display, wherein the first audible test signal is reproduced as a first audible sound by the at least one second speaker and wherein the first visual test signal is seen by the second user viewing the display; and
present a graphical user interface (GUI) on the display, where the second user navigates about the GUI using the remote control to specify an incremental time delay adjustment, wherein the incremental time delay adjustment is determined by the second user based on a difference between a time when the second user hears the wireless test signal and a time when the second user sees the presented visual test signal on the display,
wherein after the second user defines the incremental time delay adjustment, the processor system is further configured to:
communicate a second audible test signal to the at least one second speaker, wherein the second audible test signal is reproduced as a second audible sound by the at least one speaker;
communicate a second visual test signal to the display, wherein second visual test signal is communicated after the second audible test signal is communicated by an amount of time that is equal to the incremental time delay adjustment; and
define the second time delay as the amount of time of the incremental time delay adjustment if the second user hears the second audible test signal and sees the second visible test signal at the same time.

13. A method, comprising:
receiving, at a media device, a media content event with at least video content and audio content that are to be synchronously presented with each other during presentation of the media content event to at least a first user listening to at least one first speaker and a second user listening to at least one second speaker;
communicating the audio content from the media device to the at least one second speaker, wherein a first time delay associated with the at least one second speaker corresponds to a first duration defined from a first time that the audio content is communicated from the media device and a later second time that the audio content is reproduced by the at least one second speaker;
delaying communication of the video content from the media device to the display by a first delay duration that equals the first duration; and
delaying communication of the audio content from the media device to the at least one first speaker by a second delay duration,
wherein the first delay duration is greater than the second delay duration, and
wherein the second delay duration is defined based on the first time that the audio content is communicated from the media device and a later third time that the audio content is reproduced by the at least one first speaker.

14. The method of claim 13, wherein the at least one first speaker is a first component of a media presentation system and the display is a second component of the media presentation system.

15. The method of claim 13, wherein the at least one first speaker is a component of an audio presentation device and the display is a component of a visual display device.

16. The method of claim 13, wherein the at least one second speaker is a component of a mobile phone, and wherein the video content is concurrently communicated to the cellular phone and is presented on a display of the mobile phone.

17. The method of claim 13, wherein the at least one second speaker is communicatively coupled to a mobile phone, and wherein the second time delay is defined by a sum of the second duration for the audio content to be communicated from the media device to the mobile device and a fourth duration for the audio content to be communicated from the mobile device to the at least one second speaker.

18. The method of claim 13, further comprising:
receiving information from a remote website defining at least one of the second time delay and the second duration.

19. The method of claim 18, further comprising:
receiving, from the second user, identifying information that identifies the at least one second speaker; and
communicating the identifying information to the remote website,
wherein the information defining the at least one of the second time delay and the second duration is determined by the remote website based on the communicated identifying information that identifies the at least one second speaker.

20. The method of claim 13, wherein the media device is configured to receive a wireless signal from a remote control used by the second user of the wireless audio headset, the method further comprising:
concurrently communicate from the media device a first audible test signal to the at least one second speaker and a first visual test signal that is presented on the display, wherein the first audible test signal is reproduced as a first audible sound by the at least one second speaker and wherein the first visual test signal is seen by the second user viewing the display;
present a graphical user interface (GUI) on the display after communicating the first audible test signal and the first visual test signal, where the second user navigates about the GUI using the remote control to specify an incremental time delay adjustment, wherein the incremental time delay adjustment is determined by the second user based on a difference between a time when the second user hears the wireless test signal and a time when the second user sees the presented visual test signal on the display; and
receiving the wireless signal from the remote control, wherein the wireless signal includes information corresponding to the incremental time delay adjustment,
wherein after receiving the wireless signal with the incremental time delay adjustment information, the method further comprises:
communicating from the media device a second audible test signal to the at least one second speaker, wherein the second audible test signal is reproduced as a second audible sound by the at least one speaker;
communicating from the media device a second visual test signal to the display, wherein second visual test signal is communicated after the second audible test signal is communicated by an amount of time that is equal to the incremental time delay adjustment; and
defining the second time delay as the amount of time of the incremental time delay adjustment if the second user hears the second audible test signal and sees the second visible test signal at the same time.

* * * * *